United States Patent
Kaimai et al.

(10) Patent No.: US 6,878,263 B2
(45) Date of Patent: Apr. 12, 2005

(54) RUBBER PROCESS OIL AND PRODUCTION PROCESS THEREOF

(75) Inventors: Takashi Kaimai, Saitama-ken (JP); Kazumitsu Fujihara, Saitama-ken (JP); Yoshiyuki Morishima, Saitama-ken (JP)

(73) Assignee: Japan Energy Corporation (JP)

( * ) Notice: Subject to any disclaimer, the term of this patent is extended or adjusted under 35 U.S.C. 154(b) by 706 days.

(21) Appl. No.: 09/844,780

(22) Filed: Apr. 27, 2001

(65) Prior Publication Data

US 2001/0023307 A1 Sep. 20, 2001

Related U.S. Application Data

(62) Division of application No. 09/235,024, filed on Jan. 21, 1999, now Pat. No. 6,248,929.

(30) Foreign Application Priority Data

Jan. 22, 1998 (JP) .............................................. 10-24037
Jun. 24, 1998 (JP) ........................................... 10-176850

(51) Int. Cl.$^7$ ............................. C10L 1/00; C10C 3/08; C10C 1/18; C10G 17/04
(52) U.S. Cl. ............................. 208/14; 208/41; 208/45; 208/309; 208/311; 585/1; 585/241; 585/13
(58) Field of Search ................................ 585/241, 314, 585/319, 322, 1; 208/309, 41, 45, 311, 14

(56) References Cited

U.S. PATENT DOCUMENTS

| | | |
|---|---|---|
| 4,892,644 A | 1/1990 | Choi et al. |
| 5,504,135 A | 4/1996 | Ardrizzi et al. |
| 5,840,175 A | 11/1998 | Aldous et al. |
| 5,846,405 A | 12/1998 | Aldous et al. |
| 6,024,864 A | 2/2000 | Aldous et al. |
| 6,103,808 A | 8/2000 | Hashimoto |

FOREIGN PATENT DOCUMENTS

| | | |
|---|---|---|
| EP | 0417980 | 3/1991 |
| EP | 0430444 | 6/1991 |
| EP | 0489371 | 6/1992 |
| EP | 0933418 A2 * | 4/1999 |
| FR | 2689575 | 7/1993 |

OTHER PUBLICATIONS

Kurtz et al. *Anal. Chem.*, vol. 30, pp. 1224 (1958).
Japanese Treatise, "Fuel Analysis Test Methods"; 1$^{st}$ Edition Nankodol, pp. 474–478 (1968).
Wommelsdorff et al. Ein Betrag Zur Reduzierung Der Polyzyklischen Aromaten Aus Aromatuschen Mineraloel-weichmache Kautschuk Und Gumm—Kunstoffe, De Dr. Alfred Huthig Verlag GMBH. Heidelberg. vol. 45, No. 1, pp. 24–29 with English translation.

* cited by examiner

*Primary Examiner*—Walter D. Griffin
*Assistant Examiner*—Tam M. Nguyen
(74) *Attorney, Agent, or Firm*—McDonnell Boehnen Hulbert & Berghoff LLP

(57) ABSTRACT

Disclosed is a rubber process oil in which the content of polycyclic aromatics (PCAs) as determined by the IP 346 method is less than 3% by mass and which is rich in aromatic hydrocarbons, and a method for producing the same. The aniline point of the rubber process oil is 80° C. or less, and the % $C_A$ value as determined by ring analysis according to the Kurtz method is from 20 to 50%. The rubber process oil is produced by using extraction of lube oil fraction with a solvent having a selective affinity for aromatics. The extraction conditions are determined so that the extraction yield is regulated to a predetermined requirement defined by the PCAs content of the lube oil fraction. Alternatively, the extract is cooled to further separate into the extract and the raffinate, and the second raffinate is used for the rubber process oil.

4 Claims, No Drawings

RUBBER PROCESS OIL AND PRODUCTION PROCESS THEREOF

This is a divisional of application Ser. No. 09/235,024 filed on Jan. 21, 1999, now U.S. Pat. No. 6,248,929.

BACKGROUND OF THE INVENTION

1. Field of the Invention

The present invention relates to process oil which is to be added to natural or synthetic rubber and a process of producing the process oil, and in particular, to rubber process oil which can be easily handled and whose toxicity and carcinogenicity are low due to reduction of the content of polycyclic aromatics and the production process thereof.

2. Description of the Related Art

The process oil is used to facilitate the operation of manufacturing the rubber, such as kneading, extrusion, molding, etc., by means of its propertiy to penetrate into the texture of a rubber polymer. Moreover, it is also used to improve the physical properties of rubber products. For such process oil, it is necessary to have suitable affinity for rubber. On the other hand, the rubber to be processed can be classified into natural rubber and synthetic rubber, and there are many types of synthetic rubber. Among them, natural rubber and styrene-butadiene rubber (SBR) are used in specially large amounts. Accordingly, process oil containing a large amount of aromatic hydrocarbons, which have a high affinity for the rubber, is generally used.

To prepare this rubber process oil, use is made of a lubricant fraction obtained by distillation of crude oil under reduced pressure; an oil which is obtained by deasphalting residues distilled under reduced pressure, subjecting as necessary to dewaxing treatment and hydrogenation refining treatment, and further subjecting to sulfuric acid refining treatment; or an extract which is obtained by extraction treatment of oil with a solvent having an affinity for aromatic hydrocarbons. Thus obtained rubber process oil contains 70 to 99% aromatics as determined by column chromatography, has a % $C_A$ value of 20 to 50% as determined by ring analysis according to the Kurtz method, and contains 5 to 25% by mass of extracted matter with dimethylsulfoxide (DMSO) which corresponds to a content of polycyclic aromatics (PCAs) according to the standards of The Institue of Petroleum.

In recent years, however, the carcinogenicity of PCAs comes to be regarded as Important. In Europe, oil etc. containing 3 or more % PCA are obliged to indicate that they are toxic, and there is a trend toward regulation of their use. Accordingly, it becomes an urgent task to reduce the content of PCAs in rubber process oil to less than 3%.

For the rubber process oil with the content of PCA reduced to less than 3%, Japanese Laid-Open Patent No. 6-505,524 (national publication of Japanese translation of Internatinal Patent Application No. PCT/US92/00379) discloses a process which comprises deasphalting treatment of a reduced-pressure residue fraction and then dewaxing treatment of the resulting oil in order to produce rubber process oil with a reduced content of PCA of less than 3%. Moreover, Japanese Laid-Open Patent No. 7-501,346 (national publication of International Patent Application No. PCT/US91/04497) discloses a non-carcinogenic bright stock extract and a deasphalted oil having a low PCA content as well as a process for producing the same, wherein use is made of an oil obtained by deasphalting of residues in a vacuum distillation column, or an oil whose aromatics are reduced by extraction treatment of the deasphalted oil, or an oil obtained by dewaxing treatment thereof.

The above oils have a lower content of PCA, but then have a high aniline point. The aniline point can indicate the content of aromatic hydrocarbons, and to have a high aniline point means a low content of aromatic hydrocarbons. However, according as the content of aromatic hydrocarbons in oil is decreased, the affinity of the oil for rubber is decreased. Therefore, there is still the problem that an essential property of rubber process oil, i.e. the ability of rubber process oil to blend a rubber polymer, is lowered in the materials disclosed in the above publications. Moreover, there is also the problem that it becomes difficult to satisfy the physical states of a final rubber product.

SUMMARY OF THE INVENTION

The present invention was made to solve the problems described above. That is, the primary object of the present invention is to provide highly safe rubber process oil with a high ability to blend a rubber polymer, as well as a process for producing the same.

The secondary object of the present invention is to provide a rubber product excellent in safety without causing the reduction of rubber processability and without reducing the physical properties of a rubber product.

The above objects are accomplished by providing rubber process oil which is rich in aromatic hydrocarbons, while the content of polycyclic aromatics is less than 3% by mass.

The third object of the present invention is to provide a novel method for producing rubber process oil as described above.

In order to achive the above-mentioned object, rubber process oil according to the present invention is such rubber process oil that the content of polycyclic aromatics as determined by the IP 346 method is less than 3% by mass, the aniline point is 80° C. or less, and the % $C_A$ value as determined by ring analysis according to the Kurtz method is from 20 to 50%.

Moreover, in one aspect of the present invention, a method for producing rubber process oil comprises the steps of: preparing a raw material oil which is selected from the group consisting of: a lube oil distillate from crude oil by vacuum distillation; and deasphalted oil obtained by from vacuum residue; subjecting the raw material oil to extraction with a solvent having selective affinity for aromatic hydrocarbons, to obtain a first raffinate and a mixture of a first extract and the solvent; and cooling the mixture of the first extract and the solvent to separate into a second raffinate and a mixture of a second extract and the solvent under such cooling conditions that the content of polycyclic aromatics in the second raffinate is made less than 3% by mass as determined by the IP 346 method.

In another aspect of the present invention, a method for producing rubber process oil, comprises: preparing a raw material oil which is selected from the group consisting of: a lube oil distillate from crude oil by vacuum distillation; and deasphalted oil obtained from vacuum residue; and subjecting the raw material oil to extraction with a solvent having selective affinity for aromatic hydrocarbons under extraction conditions regulated such that the content of polycyclic aromatics in an extract is made less than 3% by mass as determined by the IP 346 method and the aniline point of the extract is made 80° C. or less.

In further aspect of the present invention, a method for producing rubber process oil, comprises the steps of: preparing a raw material oil which is selected from the group consisting of: a lube oil distillate from petroleum by vacuum distillation; and deasphalted oil obtained from vacuum residue; subjecting the raw material oil to extraction with a solvent having selective affinity for aromatic hydrocarbons, to separate into a first raffinate and a mixture of a first extract and the solvent; and cooling the mixture of the first extract and the solvent to separate into a second raffinate and a mixture of a second extract and the solvent in such a manner that the yield of the second raffinate to the first extract is 90% or less.

In a still more aspect of the present invention, a method for producing rubber process oil, comprises the steps of: preparing a raw material oil which is selected from the group consisting of: a lube oil distillate from petroleum by vacuum distillation; and deasphalted oil obtained from vacuum residue; and subjecting the raw material oil to extraction with a solvent having selective affinity for aromatic hydrocarbons, to separate into a first raffinate and a mixture of a first extract and the solvent at a temperature of 135° C. or higher than 135° C., in such conditions that the yield of the extract to the raw material oil satisfies the formula (1):

$$Y > 33W + 6 \quad (1)$$

wherein Y is the yield of the extract (% by mass) to the raw material oil, and W is the content of aromatics (% by mass) in the raw material oil, as determined by the IP 346 method.

The features and advantages of the rubber process oil and the production process thereof according to the present invention over the proposed process oils and the production proceeses will be more clearly understood from the following description of the preferred embodiments of the present invention.

DETAILED DESCRIPTION OF THE PREFERRED EMBODIMENTS

In general, rubber process oil can be prepared from petroleum, in particular, lube oil fractions separated from petroleum. The lub oil fraction can be obtained as a distillate fraction, which contains a large amount of aromatic compounds having a high boiling point by vacuum distillation from residual oil which is separated from petroleum by atmospheric distillation or topping, or as a deasphalted oil which is obtained from vacuum residue. Such lub oil fraction contains a large amount of polycyclic aromatics (PCAs). If it is possible to obtain a portion containing sufficient amount of aromatic compouds but less amount of PCAs from the lube oil fraction, it becomes possible to provide a preferable rubber process oil.

As a method for separating some component(s) from an oil material, there is known solvent extraction. If a solvent having a selective affinity for aromatic hydrocarbon compounds is used in the solvent extraction, the aromatic hydrocarbon compounds contained in the oil material are possibly separated and taken off the oil material. However, such a solvent having a selective affinity for armoatic hydrocarbon compounds has a stronger affinity for PCAs as well. Therefore, even if selective extraction is made on the lube oil fraction with such an extraction solvent in accordance with common measures, the obtained extract contains a large amount of PCA.

The present inventors extensively examined a process for producing an oil having a less amount of polycyclic aromatics and a higher content of aromatic hydrocarbonds. As a result, the present inventors found that such oil can be produced efficiently by improving the solvent extraction.

According to the present invention suggested are two embodiments of a novel production method in each of which improvement is made respectively on the solvent extraction with a solvent having a selective affinity for armoatic hydrocarbon compounds, so as to produce a suitable rubber process oil in which aromatic hydrocarbon compounds is sufficiently rich but the content of PCAs is less, with use of an oil fraction which is rich in aromatic compounds having a high boiling point as a starting material.

In the first embodiment of production method for rubber process oil, a lube oil fraction collected from petroleum by distillation under reduced pressure, or a deasphalted oil fraction which is obtained by deasphalting the distillation residue from petroleum, is treated with a solvent having a selective affinity for aromatic hydrocarbons, then a mixture of the solvent and the extracted matter (first extract) is cooled under conditions which are regulated such that the content of polycyclic aromatics in a second raffinate to be separated is made less than 3% by mass. Namely, the feature of the first embodiment resides in that the extract (1st extract) separated by solvent extraction of the raw material oil is cooled to a temperature lower than the extraction temperature to further separate into an extract (2nd extract) and a raffinate (2nd raffinate) which is to be recovered.

In the second embodiment of the production method for rubber process oil, a lube oil fraction collected from petroleum by distillation under reduced pressure, or deasphalted oil fraction which is obtained by deasphalting the distillation residues from petroleum, is treated with a solvent having a selective affinity for aromatic hydrocarbons under extraction conditions which are regulated such that the content of polycyclic aromatics in the resulting extract is made less than 3% by mass and the aniline point of the extract is made 80° C. or less. Namely, the feature of the second embodiment resides in that the raw material oil is extracted at a higher temperature and extraction conditions are controlled so that the extract is recovered in a specific and appropriate extraction yield.

The process oil obtained by each of these embodiments of the production method is most suitable as rubber process oil which has a less content of polycyclic aromatics but is rich in aromatic hydrocarbons.

Here, it should be noted that the content of PCAs, as used in this application, refers to the content of aromatic compounds extracted with DMSO (dimethylsulfoxide) in accordance with the IP 346 method specified by The Institute of Petroleum. Although some conventional definition of PCAs refers to aromatic compounds having 3 or more rings which are said to have toxicity in question, the IP 346 method is a common and standard method which has been authorized for determination of the content of PCAs in oil materials.

The rubber process oil obtained in the present invention is significantly low in the content of polycyclic aromatics, but has a high content of aromatic hydrocarbons as compared with the conventional rubber process oil, so the present process oil has a high ability to blend rubber such as SBR rubber, natural rubber and the like without reducing the processability of rubber. In addition, the present process oil is a sufficient material to obtain oil-processed rubber products which can exhibit physical characteristics at almost the same levels as those of rubber products treated with conventional process oil containing a large amount of PCAs.

Now, the first embodiment of the production method according to the present invention will be described below in detail.

To produce the process oil of the invention, starting oil or a lube oil fraction such as a heavy fraction collected from petroleum, or deasphalted oil obtained by deasphalting of distilled residue (e.g. residue distilled under reduced pressure) obtained from petroleum, is treated with a solvent having a selective affinity for aromatic hydrocarbons, then a first extract in the form of a mixture with the solvent is obtained by removing a raffinate (first raffinate) therefrom. Then the mixture of the first extract and the solvent is cooled and separated to give a second raffinate from which the process oil of the invention can be obtained.

The petroleum includes various types of crude oil such as paraffin crude oil, naphthene crude oil and the like, and a heavy fraction obtained by distilling any kind of crude oil under reduced pressure, deasphalted oil from the residue obtained by distilling any crude oil under reduced pressure and the likde can be used as the starting material in the present invention. Said heavy fraction or said deasphalted oil may be further extracted with a solvent having an affinity for aromatic hydrocarbons and subjected as necessary to hydrogenation refining and dewaxing treatment for use. As a matter of course, there is no problem with use of a mixture thereof with adjusted viscosity. The petroleum or the raw material for obtaining the lube oil fraction is not limited to crude oil, and any oil material that is rich in aromatic compounds having a high boiling point, such as cracking oil from plastics, waste or recycled oil mixture and the like, can also be utilized.

For the solvent having a selective affinity for aromatic hydrocarbons which is used for extraction of the heavy fraction or the deasphalted oil, it is possible to use one or more members selected from furfural, phenol, N-methyl-2-pyrrolidone. Among then, furfural is most preferable.

For extraction treatment with the above solvent, one or more members selected from lube oil fractions collected from petroleum by distillation under reduced pressure and deasphalted oil obtained by deasphalting treatment of distilled residues obtained from petroleum are contacted with the solvent at a temperature of 60° C. or more, preferably 60 to 150° C., at a solvent/oil ratio (by volume) of 1/1 to 4/1 and then a first raffinate is removed. This raffinate can be used as a general lubricant base oil material. The obtained mixture of the first extract and the solvent is to be subjected to the subsequent step. Since the yield of the first raffinate is greatly affected by the composition of the lube oil fraction which is also changed by the states of the used petroleum or crude oil, the extraction conditions should not be always fixed identically. However, it has been found from the inventors' researches that a suitable extract can be obtained when the yield of the first raffinate is generally 45 vol % or more, preferably 50 to 85 vol %, more preferably 55 to 80 vol %. Therefore, the extraction conditions are regulated so that the yield of the first extract shall be 55 vol % or less, preferably 5 to 55 vol %, more preferably 15 to 50 vol %, and most preferably 30 to 45 vol %.

If the yield of the first extract is more than 55 vol %, the concentration of aromatic hydrocarbons in the second raffinate which is to be obtained through the subsecuent steps becomes too low due to an increased amount of non-aromtic compounds contained in the extract. If the yield of the first extract is less than 5 vol %, the first raffinate may not be usable in some cases as a general lubricant base oil material.

When the mixture of the first extract and the solvent is cooled, the second raffinate comes to be separated from the mixture of the solvent. By taking the second raffinate out and further removing therefrom the solvent which is contained therein at a small amount, the second raffinate as the desired product of the invention can be obtained.

The cooling conditions greatly affect on the yield of the second laffinate and the content of polycyclic aromatics therein. Since the composition of the first extract changes according to the conditions for solvent extraction and the concentration of PCAs in the starting material, the cooling conditions appropriate for making the concentration of polycyclic aromatics in the second raffinate less than 3% by mass are not fixed. They are determined in accordance with the content of PCAs in the first extract.

Typically, if the concentration of polycyclic aromatics in the first extract ranges from 20 to 30% by mass, the temperature is set lower by about 10 to 110° C. than the temperature for solvent extraction treatment, whereby the concentration of polycyclic aromatics in the second raffinate can be made less than 3% by mass. At this time, the yield of the second raffinate relative to the first extract is about 20 to 50%. If the concentration of polycyclic aromatics in the first extract is 3 to 10% by mass, the temperature is made lower by about 20 to 130° C. than the temperature for solvent extraction treatment, whereby the concentration of polycyclic aromatics in the second raffinate can be made less than 3% by mass. In this case, the yield of the second raffinate relative to the first extract is about 50 to 90%.

The second raffinate thus obtained is rich in aromatic hydrocarbons. This oil product has an aniline point of 80° C. or less, and its % $C_A$ value as determined by ring analysis according to the Kurtz method is 20 to 50%. The % $C_A$ value as determined by ring analysis according to the Kurtz method serves as an indication of the ratio of the amount of carbon elements which are constituent of aromatic rings relative to the amount of the whole carbon elements. The concentration of aromatic hydrocarbons in the second raffinate is not significantly lowered because the second raffinate is produced from the extract with the solvent having an affinity to aromatics.

For the use of the rubber process oil, if the % $C_A$ by ring analysis according to the Kurtz method is less than 20%, it is afraid that manufacture of rubber with the rubber process oil becomes difficult and that the physical characteristics of the rubber product are lowered. On the other hand, if the % $C_A$ value by ring analysis of the Kurtz method exceeds 50%, it is also afraid that the physical characteristics of the rubber product are lowered. In view of the above, the % $C_A$ value of the second raffinate should be from 20 to 50%, preferably from 25 to 45%, more preferably from 25 to 40%.

Next, the second embodiment of the production method according to the present invention will be described below in detail.

In the second embodiment, the starting oil or lube oile fraction such as a lubricant fraction collected from petroleum, or deasphalted oil obtained by deasphalting of distilled residue (e.g. reduced-pressure residues) from petroleum, is extracted with a solvent having affinity for aromatic hydrocarbons, followed by removal of a raffinate (first raffinate) to give a first extract from which the process oil of the invention can be obtained.

The petroleum includes various types of crude oil such as paraffin crude oil, naphthene crude oil and the like, and a heavy fraction obtained by distilling any kind of crude oil under reduced pressure, deasphalted oil from the residue obtained by distilling any crude oil under reduced pressure and the likde can be used as the starting material in the present invention. Said heavy fraction or said deasphalted oil may be further extracted with a solvent having an affinity for aromatic hydrocarbons and subjected as necessary to hydrogenation refining and dewaxing treatment for use. As a matter of course, there is no problem with use of a mixture thereof with adjusted viscosity. The petroleum or the raw material for obtaining the lube oil fraction is not limited to crude oil, and any oil material that is rich in aromatic compounds having a high boiling point, such as pyrolytically produced oil from plastics, waste or recycled oil mixture and the like, can also be utilized.

For the solvent having a selective affinity for aromatic hydrocarbons which is used for extraction of the heavy fraction or the deasphalted oil, it is possible to use one or more members selected from furfural, phenol, N-methyl-2-pyrrolidone. Among then, furfural is most preferable.

For extraction treatment with the above solvent, one or more members selected from lubricant fractions collected from petroleum by distillation under reduced pressure and deasphalted oil obtained by deasphalting treatment of distilled residue obtained from petroleum are contacted with the solvent at a column-top temperature of about 135 to 150° C. at a solvent/oil ratio (by volume) of about 1/1 to 4/1.

The mixture of the extract and the solvent obtained by this treatment is separated into the solvent and the extract which is used for the rubber process oil.

For this solvent extraction, it should be noted that extraction conditions are controlled to regulate the extraction yield so that the content of polycyclic aromatics in the extract is made less than 3% by weight, its aniline point is made 80° C. or less, preferably 70° C. or less.

The results of extraction changes according to the states of the starting oil material to be extracted, and determination of appropriate extraction conditions is rather complicated. However, the inventors have found the measures for relatively simply determining the extraction conditions from states of the starting oil material. In the present invention, the extraction conditions are set in such a manner that the extraction yield satisfy a certain requirement which is specified by the content of polycyclic aromatics in the starting oil material to be extracted, and the extraction yield is controlled by regulating the extraction temperature or the column-top temperature of the extractor. The requirement for the extraction yield is as follows.

If the aniline point of the starting oil, i.e. lube oil fraction or the deasphalted oil to be extracted, is in the range of 105 to 115° C., and if the content of polycyclic aromatics in the starting oil is in the range of 0.8 to 1.5% by mass, the extraction yield is regulated to satisfy the following formula (1), wherein the letter Y represents the extract yield (%) and letter W represents the content (% by mass) of polycyclic aromatics in the starting oil to be extracted. Here, the extract yield is regulated by controlling the extraction temperature or the column-top temperature within the range of about 130° C. or above, preferably 135 to 150° C. As a result of above, the concentration of polycyclic aromatics in the extract is made less than 3% by mass.

$$Y>33W+6 \qquad (1)$$

The extract thus obtained has an aniline point of 80° C. or less, which is rich in aromatic hydrocarbons, and possesses a % $C_A$ value ranging from 20 to 45% as determined by ring analysis according to the Kurtz method. The concentration of aromatic hydrocarbons in the extract is not significantly lowered because the extract is produced with a solvent having an affinity for aromatics.

If the states of the starting oil are out of the above-described assumption such that the content of PCAs is more, the concentration of PCAs in the obtained extract will exceed 3% by mass. However, it is still possible to further separate the extract by cooling in accordance with the first embodiment of the production method as described above.

Moreover, the concentration of polycyclic aromatics and the aniline point of the extract obtained in the present invention were examined by the inventors, and as a result, it was revealed that there is a relationship between them as approximately represented by the following formula (2), wherein the letter Z is the aniline point (° C.) and the letter X is the concentration of polycyclic aromatics (% by mass) in the extract.

$$Z=80/X+38 \qquad (2)$$

According to the formula (2), if the aniline point of the obtained extract is 80° C. or less, the concentration of polycyclic aromatics in the extract comes to be about 1.9% by mass or more. In a case of a higher content of aromatic hydrocarbons, for example, an aniline point of 70° C. or less, the concentration of polycyclic aromatics in the extract is about 2.5% by mass or more. If the aniline point of the extract exceeds 80° C., the content of aromatic hydrocarbons in the extract is unfavorable so that the product is not suitable for process oil.

In the conventional methods, extraction conditions are adopted so as to raise the yield of the raffinate, and even if the yield of the extract is raised under the same extraction temperature, it is difficult to obtain an extract oil having such composition as in the present invention. In contrast with this, the extract obtained in the second embodiment of the production method according to the present invention has an aniline point of 80° C. or less, though the content of polycyclic aromatics is less than 3% by mass. The reason of this success is considered that the column-top temperature of the extraction column is set higher by 5 to 20° C. than the conventional temperature. Specifically, it is considered that, when the temperature of extraction solvent rises, the affinitie of the extraction solvent for aromatic hydrocarbons but not PCAs increases more than that for PCAs does. Accordingly, extraction at a higher temperature improves extraction of aromatic hydrocarbons but not PCAs more than that of PCAs.

Accordingly, if the aniline point of the lube oil fraction or deasphalted oil as the starting material is 105 to 115° C. and the content of polycyclic aromatics is 0.8 to 1.5% by mass, then the temperature of the column top is in the range of about 135° C. or more, preferably 140 to 150° C. If the column-top temperature of the extraction column is less than 135° C., the content of polycyclic aromatics in the extract may become 3% by mass or more and is thus unfavorable. On the other hand, if the column-top temperature is higher than 150° C., it may be necessary to alter instruments in order to regulate the pressure in the extraction column.

Even if the states of the starting material or the extraction conditions are different from those described above, the similar effect in the extraction will be obtained by raising the column-top temperature by about 5 to 20° C. than the conventional operating conditions. However, it may be necessary to re-examine operating conditions and the relationship represented by the formula (1).

If the second embodiment of the production process is applied, the extract which is obtained by conducting one-step solvent extraction can be used directly as a product, resulting in reduction of production costs as compared with the conventional method where dewaxing treatment is usually conducted after solvent extraction.

As described above, in the first and second embodiments of the production method according to the invention, it is possible to obtain rubber process oil in which the content of polycyclic aromatics is less than 3% by mass, but it is rich in aromatic hydrocarbons. In this process oil, the content of polycyclic aromatics having 3 or more rings is possibly made less than 2% by mass, which is preferable in view of carcinogenicity. According to the present invention, it is also possible to obtain process oil in which the total acid value is less than 0.04 mg KOH/g. In view of the durability of rubber, a total acid value of more than 0.1 mg KOH/g is not preferable for the rubber process oil because thermal and oxidative stability is worsened to result in a decrease of the durability of rubber. Therefore, the rubber process oil obtained by the production method according to the present invention is suitable.

EXAMPLES

The present invention and the effects thereof will be described below in detail with reference to the Examples and Comparative Examples.

The measurement items in the present invention were determined according to the following methods.

(Measurement of Polycyclic Aromatic (PCA)

Concentration: measurement method according to DMSO extraction)

The concentration of PCAs was determined by using the IP 346 (1992 version) test method.

Accordingly, the content of polycyclic aromatics, as used for the present invention, refers to the content of PCAs extracted with DMSO (dimethylsulfoxide) according to the IP 346 method and this content does not refer to the content of polycyclic aromatics having 3 or more rings.

Among PCAs, the content of polycyclic aromatics having 3 or more rings was determined, using measurement by high performance liquid chromatography (HPLC). The measurement conditions are as follows:

Column: Spherisorb A5Y 250×4.6 mm
Oven: 40° C.
Flow rate: 2.5 ml/min.
Eluents:

| Time (min) | Dichloromethane (%) | Hexane (%) |
| --- | --- | --- |
| 0.0 | 0 | 100 |
| 10.0 | 0 | 100 |
| 30.0 | 40 | 60 |
| 30.1 | 100 | 0 |
| 50.0 | 100 | 0 |
| 50.1 | 0 | 100 |
| 70.0 | 0 | 100 |

Detector: UV 270 nm

Injection volume: 20 μl (ten-time diluted)

Calculation: The percentage of each type of aromatics in the PCAs of the sample oil was determined by the following formulas, and the content of the three-or-more-ring type aromatics was calcuated from the obtained percentage of that type and the content of the PCAs.

One-ring type aromtics (%)=(one-ring area)/(one-ring area+0.1×two-ring area+0.025×three-or-more-ring area)×100

Two-ring type aromatics (%)=(0.1×two-ring area)/(one-ring area+0.1×two-ring area+0.025×three-or-more-ring area)×100

Three-or-more-ring type aromtics (%)=(0.025×three-or-more-ring area)/(one-ring area+0.1×two-ring area+0.025×three-or-more ring area)×100

(Ring Analysis According to the Kurtz Method)

The % $C_A$ value was calculated according to "Fuel Analysis Test Methods (1st ed.)", pp. 474–478, published by Nankodo (1968) in Japan.

(Dynamic Viscosity)

It was determined according to Japan Indastry Standard No. K 2283.

(Aniline Point)

It was determined according to Japan Indastry Standard No. K 2256.

(Total Acid Value)

It was determined according to Japan Indastry Standard No. K 2501.

Example 1-1

Residue obtained by distilling an Arabian light crude oil under atmospheric pressure was distilled under reduced pressure, and an effluent oil with a boiling point in the range of 340 to 650° C. was collected. Then, two parts by volume of furfural was added to 1 part by volume of the above effluent oil in a rotary counter flow contact extractor, and the mixture was subjected to solvent extraction treatment at a temperature of 115 to 120° C. to remove the first raffinate from a mixture of the first extract and furfural. The mixture of the first extract and furfural was collected. The yield of the first extract relative to the effluent oil was 40 vol % by mass. The extract mixture was cooled at 60° C. and left for one day, and the second raffinate thus separated was separated, followed by evaporating and removing a small mount of furfural contained in the second raffinate to give the second raffinate. The yield of the resulting second raffinate relative to the first extract was 32 vol % by mass. The content of polycyclic aromatics as determined by the IP 346 method was 2.8% by mass (particularly the content of polycyclic aromatics having three or more rings was 1.8% by mass), the % $C_A$ value as determined by ring analysis according to the Kurtz method was 31.5%, the kinematic viscosity (40° C.) was 412 mm$^2$/s, the aniline point was 58° C., and the total acid value was 0.01 mg KOH/g.

Comparative Example 1-1

The content of polycyclic aromatics in the first extract obtained in the above Example 1-1 was measured as one example of conventional rubber process oil, resulting in 23% by mass (particularly the content of polycyclic aromatics having 3 or more rings was 19.5% by mass). Moreover, the % $C_A$ value as determined by ring analysis according to the Kurtz method was 48%, the kinematic viscosity (40° C.) was 2360 mm$^2$/s, the aniline point was 43° C., and the total acid value was 0.05 mg KOH/g.

Example 1-2

Residue obtained by distilling an Arabian light crude oil under reduced pressure was subjected to deasphalting treatment to give a first ectract with a kinematic viscosity (40° C.) of 633 mm$^2$/s. Then, three parts by volume of furfural was added to one part by volume of the above deasphalted oil, and the mixture was subjected to solvent extraction treatment at a temperature of 130 to 135° C. to give a first extract. The yield of the first extract relative to the deasphalted oil was 25 vol % by mass. The extract was cooled at 20° C. and left for one day, and the second raffinate portion thus separated was separated, followed by evaporating and removing a small amount of furfural contained in the second raffinate to give the second raffinate. The yield of the resulting second raffinate relative to the deasphalted oil was 73 vol % by mass %. The content of polycyclic aromatics as determined by the IP 346 method was 1.7% by mass (particularly the content of polycyclic aromatics having three or more rings was 1.1% by mass), the % $C_A$ value by ring analysis according to the Kurtz method was 25%, the dynamic viscosity (40° C.) was 2940 mm$^2$/s, the aniline point was 67° C., and the total acid value was 0.01 mg KOH/g.

Comparative Example 1-2

The content of PCAs in the first extract of Example 1-2 was measured, resulting in 5.1% by mass (particularly the content of polycyclic aromatics having 3 or more rings was 3.8% by mass). The % $C_A$ value by ring analysis according to the Kurtz method was 35%, the kinematic viscosity (40° C.) was 5740 mm$^2$/s, the aniline point was 60° C., and the total acid value was 0.04 mg KOH/g.

Example 2-1

Residue obtained by distilling an Arabian light crude oil under atmospheric pressure was distilled under reduced pressure, and the residue was subjected to propane deasphalting and the deasphalted oil was collected. Its kinematic viscosity (40° C.) was 700 mm$^2$/s, the content of polycyclic aromatics was 1.3% by mass, and the aniline point was 109° C. Then, three parts by volume of furfural was added to one part by volume of the above deasphalted oil, and the mixture was subjected to solvent extraction treatment at a temperature of 145° C. in a rotary plate counter flow contact extractor to give a mixture of the extract and furfural. The yield of the resulting extract relative to the deasphalted oil was 60% by mass. The content of polycyclic aromatics in this extract was 2.6% by mass (particularly the content of polycyclic aromatics having three or more rings was 1.7% by mass), the % $C_A$ value by ring analysis according to the Kurtz method was 31%, the kinematic viscosity (40° C.) was 3900 mm$^2$/s, the aniline point was 68° C., and the total acid value was 0.02 mg KOH/g.

Example 2-2

An extract was obtained in the same manner as in Example 2-1 except that the extraction temperature was changed to 140° C. and the yield of the extract relative to the deasphalted oil was 50% by mass. The content of polycyclic aromatics in this extract was 2.9% by mass (particularly the content of polycyclic aromatics having three or more rings was 1.9% by mass), the % $C_A$ value by ring analysis according to the Kurtz method was 33%, the kinematic viscosity (40° C.) was 4400 mm$^2$/s, the aniline point was 65° C., and the total acid value was 0.02 mg KOH/g.

Examples 2-3 to 2-4

Residue obtained by distilling an Arabian light crude oil under reduced pressure were subjected to propane deasphalting and the deasphalted oil was collected. Its kinematic viscosity (40° C.) was 640 mm$^2$/s, the PCA content was 1.15% by mass, the aniline point was 110° C., and the total acid value was 0.02 mg KOH/g. Then, three parts by volume of furfural was added to 1 part by volume of the above deasphalted oil and the mixture was subjected to solvent extraction treatment at a temperature of 140° C. (Example 2-3) or 145° C. (Example 2-4) in a rotary plate counter flow contact extractor to give a mixture of the extract and furfural. The yield of the resulting extract relative to the deasphalted oil was 50% by mass (Example 2-3) and 60% by mass (Example 2-4). With respect to the extract of Example 2-3, the content of polycyclic aromatics in the extract was 2.8% by mass (particularly the content of polycyclic aromatics having 3 or more rings was 1.8% by mass), the % $C_A$ value by ring analysis according to the Kurtz method was 31%, the kinematic viscosity (40° C.) was 4100 mm$^2$/s, the aniline point was 66° C., and the total acid value was 0.02 mg KOH/g. In Example 2-4, the content of polycyclic aromatics was 2.5% by mass (particularly the content of polycyclic aromatics having 3 or more rings was 1.6% by mass), the % $C_A$ value by ring analysis according to the Kurtz method was 28%, the kinematic viscosity (40° C.) was 3600 mm$^2$/s, the aniline point was 70° C., and the total acid value was 0.01 mg KOH/g.

Examples 2-5 to 2-7

Residue obtained by distilling an Arabian light crude oil under reduced pressure were subjected to propane deasphalting and the deasphalted oil was collected. Its kinematic viscosity (40° C.) was 630 mm$^2$/s, the PCA content as 1.00% by mass, and the aniline point was 110° C. Then, three parts by volume of furfural was added to one part by volume of the above deasphalted oil and the mixture was subjected to solvent extraction treatment at a temperature of 135° C. (Example 2-5), 140° C. (Example 2-6) or 145° C. (Example 2-7) in a rotary plate counter flow contact extractor to give a mixture of the extract and furfural. The yield of the resulting extract relative to the deasphalted oil was 40% by mass (Example 2-5), 50% by mass (Example 2-6). and 60% by mass (Example 2-7), respectively. For the extract of Example 2-5, the content of polycyclic aromatics in the extract was 2.9% by mass (particularly the content of polycyclic aromatics having 3 or more rings was 1.9% by mass), the % $C_A$ value by ring analysis according to the Kurtz method was 32%, the kinematic viscosity (40° C.) was 4200 mm$^2$/s, the aniline point was 64° C., and the total acid value was 0.02 mg KOH/g. For Example 2-6, the content of polycyclic aromatics was 2.4% by mass (particularly the content of polycyclic aromatics having 3 or more rings was 1.5% by mass), the % $C_A$ value by ring analysis according to the Kurtz method was 27%, the kinematic viscosity (40° C.) was 3500 mm$^2$/s, the aniline point was 71° C., and the total acid value was 0.02 mg KOH/g. For Example 2-7, the content of polycyclic aromatics was 2.1% by mass (particularly the content of polycyclic aromatics having 3 or more rings was 1.3% by mass), the % $C_A$ value by ring analysis according to the Kurtz method was 25%, the kinematic viscosity (40° C.) was 3100 mm$^2$/s, the aniline point was 78° C., and the total acid value was 0.01 mg KOH/g.

Comparative Examples 2-1 to 2-3

Extracts were obtained in the same manner as in Example 2-1 except that the extraction temperature was changed to 130° C. (Comparative Example 2-1), 135° C. (Comparative Example 2-2) or 150° C. (Comparative Example 2-3), and that the yield of the extract relative to the deasphalted oil was 25% by mass (Comparative Example 2-1), 40% by mass (Comparative Example 2-2) or 90% by mass (Comparative Example 2-3). For the extract of Comparative Example 2-1, the content of polycyclic aromatics in the extract was 4.8% by mass (particularly the content of polycyclic aromatics having three or more rings was 3.6% by mass), the % $C_A$ value by ring analysis according to the Kurtz method was 39%, the kinematic viscosity (40° C.) was 6500 mm$^2$/s, the aniline point was 55° C., and the total acid value was 0.05 mg KOH/g. For Comparative Example 2-2, the content of polycyclic aromatics was 3.4% by mass (particularly the content of polycyclic aromatics having three or more rings was 2.5% by mass), the % $C_A$ value by ring analysis according to the Kurtz method was 36%, the kinematic viscosity (40° C.) was 4800 mm$^2$/s, the aniline point was 61° C., and the total acid value was 0.04 mg KOH/g. For Comparative Example 2-3, the content of polycyclic aromatics was 1.8% by mass (particularly the content of polycyclic aromatics having three or more rings was 1.1% by mass), the % $C_A$ value by ring analysis according to the Kurtz method was 18%, the kinematic viscosity (40° C.) was 1100 mm$^2$/s, the aniline point was 81° C., and the total acid value was 0.01 mg KOH/g.

Comparative Example 2-4

An extract was obtained in the same manner as in Example 2-3 except that the extraction temperature was changed to 135° C. and the yield of the extract relative to the deasphalted oil was 40% by mass. The content of polycyclic aromatics in this extract was 3.2% by mass (particularly the content of polycyclic aromatics having three or more rings was 2.3% by mass), the % $C_A$ value by ring analysis according to the Kurtz method was 35%, the kinematic viscosity (40° C.) was 4900 mm$^2$/s, the aniline point was 63° C., and the total acid value was 0.03 mg KOH/g.

The process oil obtained by the present invention, having a polycyclic aromatics content of less than 3% by mass as determined by the IP 346 method, is rich in aromatic hydrocarbons, so it has excellent properties as rubber process oil. According to the present invention, it is not only possible to produce process oil having no or little effect on the human body, but also possible to substitute it for conventional process oil without greatly altering the conventional rubber production process. Further it is also expected that the physical properties of a rubber product treated with the present process oil are hardly changed.

It must be understood that the invention is in no way limited to the above embodiments and that many changes may be brought about therein without departing from the scope of the invention as defined by the appended claims.

What is claimed is:

1. Rubber process oil in which the content of polycyclic aromatics as determined by the IP346 method is less than 3% by mass, the aniline point is 80° C. or less, and the % $C_A$ value as determined by ring analysis according to the Kurtz method is from 20 to 50%.

2. The rubber process oil as set forth in claim 1, wherein the % $C_A$ value by ring analysis according to the Kurtz method is within a range from 25 to 45%.

3. The rubber process oil as set forth in claim 1, wherein the content of polycyclic aromatics having 3 or more rings is less than 2% by mass, and the total acid value is less than 0.04 mg KOH/g.

4. The rubber process oil as set forth in claim 3, wherein the % $C_A$ value by ring analysis according to the Kurtz method is within a range from 25 to 45%.

* * * * *